(12) United States Patent
Boensch et al.

(10) Patent No.: US 8,288,574 B2
(45) Date of Patent: Oct. 16, 2012

(54) METHOD FOR PRODUCING FATTY ACID METHYL ESTERS OR FATTY ACID ETHYL ESTERS

(75) Inventors: Rudolf Boensch, Nackenheim (DE); Helmut Saft, Niddatal (DE); Peter Mitschke, Maintal (DE); Henning Buchold, Hanau (DE)

(73) Assignee: Lurgi GmbH, Frankfurt am Main (DE)

( * ) Notice: Subject to any disclaimer, the term of this patent is extended or adjusted under 35 U.S.C. 154(b) by 271 days.

(21) Appl. No.: 12/743,957

(22) PCT Filed: Sep. 5, 2008

(86) PCT No.: PCT/EP2008/007250
§ 371 (c)(1),
(2), (4) Date: May 20, 2010

(87) PCT Pub. No.: WO2009/065452
PCT Pub. Date: May 28, 2009

(65) Prior Publication Data
US 2010/0311997 A1   Dec. 9, 2010

(30) Foreign Application Priority Data
Nov. 24, 2007  (DE) .................. 10 2007 056 703

(51) Int. Cl.
*C11C 3/00* (2006.01)
(52) U.S. Cl. ........ 554/169; 554/161; 554/163; 554/167; 554/172; 554/173; 554/124
(58) Field of Classification Search ............... None
See application file for complete search history.

(56) References Cited

U.S. PATENT DOCUMENTS
2009/0320355 A1   12/2009 Vieira et al.

FOREIGN PATENT DOCUMENTS

| AT | 397966 B | 8/1994 |
|---|---|---|
| DE | 4301686 C1 | 3/1994 |
| EP | 0131991 A1 | 1/1985 |
| EP | 0523767 A2 | 1/1993 |
| EP | 0523767 B1 | 12/1995 |
| JP | 2006348191 A | 12/2006 |
| WO | WO 2006043281 A1 | 4/2006 |
| WO | WO 2007020465 A1 | 2/2007 |

OTHER PUBLICATIONS

Encinar et al., Fuel Processing Technology, 20070331 Elsevier BV, NL—ISSN 0378-3820, vol. 88, Nr: 5, pp. 513-522, XP022011642.
International Search Report for PCT/EP2008/007250 mailed on Dec. 17, 2008.
Lurgi Ag, Fatty Acid Technology, company brochure, Mar. 2005.
Ma et al., Bioresource Technology, 19990101 Elsevier BV, GB—ISSN 0960-8524, vol. 70, Nr: 1, pp. 1-15, XP003001658.

*Primary Examiner* — Yate K Cutliff
(74) *Attorney, Agent, or Firm* — Leydig, Voit & Mayer, Ltd.

(57) ABSTRACT

Method for producing $C_3H_5(OH)_3$ and at least one of fatty acid methyl ester (FAME) and fatty acid ethyl ester (FAEE) includes mixing vegetable oils and animal fats, at least one of $CH_3OH$ and $C_2H_5OH$ and at least one first catalyst to transesterify a portion of triglycerides and provide a first mixture. The first mixture is separated, with a first light phase being withdrawn and fed into a second mixer where it is mixed with at least one second catalyst to transesterify a further portion of the triglycerides to provide a second mixture. The second mixture is separated, with a second light phase being withdrawn and mixed with soapless $C_3H_5(OH)_3$ to provide a dispersion which is separated by density difference. A phase containing at least one of raw FAME and raw FAEE is mixed with an aqueous acid, washed with water, with the water being expelled to provide FAME and FAEE product.

20 Claims, 2 Drawing Sheets

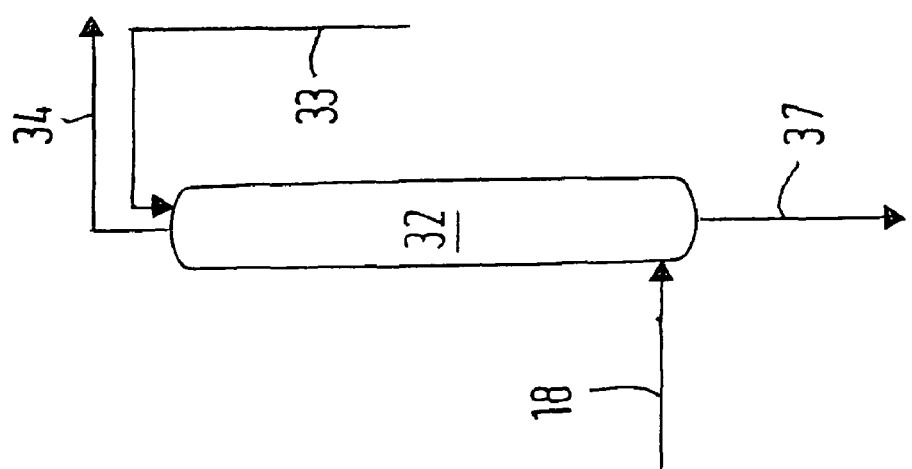

METHOD FOR PRODUCING FATTY ACID METHYL ESTERS OR FATTY ACID ETHYL ESTERS

CROSS REFERENCE TO PRIOR APPLICATIONS

This application is a U.S National Phase application under 35 U.S.C. §371 of International Application No. PCT/EP2008/007250, filed on Sep. 5, 2008 and which claims benefit to German Patent Application No. 10 2007 056 703.2, filed on Nov. 24, 2007. The International Application was published in German on May 28, 2009 as WO 2009/065452 A1 under PCT Article 21(2).

FIELD

The present invention relates to a process for producing fatty acid methyl ester (FAME) or fatty acid ethyl ester (FAEE)—subsequently referred to as fatty acid ester (FAE)—and $C_3H_5(OH)_3$ from vegetable oils or animal fats by base-catalyzed transesterification of the triglycerides with $CH_3OH$ or $C_2H_5OH$ in several, at least two interconnected mixer-settler stages, wherein the starting substances are intensively mixed in the mixers of the mixer-settler stages by transesterifying the triglycerides at the same time, and in the settler downstream of the respective mixer the mixtures produced are separated into a light phase chiefly containing FAE and into a heavy phase chiefly containing $C_3H_5(OH)_3$, the light phase chiefly containing FAE, which is withdrawn from the settler of the first mixer-settler stage, is charged to the mixer of the second mixer-settler stage, the light phase chiefly containing FAE, which is withdrawn from the settler of the second mixer-settler stage, is mixed with aqueous acid and subsequently washed in counterflow with water, the water still contained in the raw FAE obtained is expelled therefrom and the produced FAE ready for use is supplied to the further use, the heavy phase from the settlers of the second mixer-settler stage, which chiefly contains $C_3H_5(OH)_3$, is recirculated to the mixer of the first mixer-settler stage, the heavy phase from the settler of the first mixer-settler stage, which chiefly contains $C_3H_5(OH)_3$, is combined with the aqueous phase containing $CH_3OH$ or $C_2H_5OH$, $C_3H_5(OH)_3$ and salts, which is obtained when washing the light phase chiefly containing FAE, and the mixture is thermally separated into a phase containing $CH_3OH$ or $C_2H_5OH$ and into an aqueous phase containing $C_3H_5(OH)_3$ and salts, the phase containing $CH_3OH$ or $C_2H_5OH$ is recirculated into the mixer of the first mixer-settler stage, from the remaining aqueous phase containing $C_3H_5(OH)_3$ the water is evaporated, and the raw $C_3H_5(OH)_3$ left is discharged from the process for further treatment.

BACKGROUND

Because of the better environmental compatibility and better utilization of regenerative energy sources, FAME has been used as fuel in Diesel engines and FAEE has been used as fuel for spark-ignition engines to an increasing extent for a number of years. FAEs primarily are obtained from vegetable oils and animal fats, such as rape-seed oil, coconut oil, palm oil, soybean oil, fish oil, tallow or the like, by transesterifying the same in at least two interconnected reaction stages, each comprising a mixer, in which the triglycerides are transesterified in a mixing operation by adding $CH_3OH$ or $C_2H_5OH$ and an alkaline catalyst, and in a downstream settler, in which the mixture produced is physically separated in a demixing operation into a light phase chiefly containing FAE and into a heavy phase chiefly containing the $C_3H_5(OH)_3$ formed during transesterification. The $C_3H_5(OH)_3$ formed during transesterification is dissolved in excess $CH_3OH$ and separated from the $CH_3OH$ in a rectification column. In a counterflow washing column, $CH_3OH$ and $C_3H_5(OH)_3$ are washed out from the phase containing $CH_3OH$; if necessary, the methyl ester can additionally be subjected to a distillation. To obtain pharmaceutically acceptable $C_3H_5(OH)_3$, the $C_3H_5(OH)_3$ containing the impurities of the fat or fatty oil used are supplied to a downstream purification stage as described in "Fatty Acid Technology": company brochure of Lurgi AG of 03/2005.

EP 0523767 B1 describes a process for transesterifying an oil or fat with $CH_3OH$ or $C_2H_5OH$ in the presence of an alkaline catalyst in liquid phase to obtain FAME or FAEE and $C_3H_5(OH)_3$ in at least two reaction stages, which each comprise a mixing reactor and a separator for separating a light phase rich in ester and a heave phase rich in glycerol. Oil or fat as well as $CH_3OH$ or $C_2H_5OH$ and an alkaline catalyst are charged to the mixing reactor of the first reaction stage, and these substances are mixed with each other intensively. The mixing reactor of the first and each further reaction stage is charged with $CH_3OH$ or $C_2H_5OH$ and a catalyst and with the light phase rich in ester, which is obtained in the preceding reaction stage. The total amount of $CH_3OH$ or $C_2H_5OH$ supplied to the mixing reactors lies in the range of 1 to 3 times the stoichiometrically necessary amount. As alkaline catalysts, NaOH, KOH or $CH_3NaOH$ can, for example, be used in a concentration of generally 0.1 to 1 wt-%, based on the amount of oil or fat to be transesterified. The heavy phase rich in glycerol, which is separated in the separator of the second to last reaction stages, is at least partly recirculated to the mixing reactor of the first reaction stage. By washing with water containing 0.5 to 5 wt-% of acid, for instance, HCl or citric acid, the alkaline catalyst contained in the light phase rich in ester is neutralized, and the formation of soaps thereby is prevented. In a downstream water washing, the water-soluble substances contained in the light phase rich in ester, above all $CH_3OH$ or $C_2H_5OH$ and $C_3H_5(OH)_3$ and the neutralized catalyst are washed out. By means of a centrifuge, the suspension formed thereby is separated into FAME or FAEE with a water content of up to 2 wt-% and into a phase rich in water, which substantially contains $CH_3OH$ or $C_2H_5OH$ and $C_3H_5(OH)_3$. Since the FAME or FAEE usable as fuel in internal combustion engines should contain not more than 500 mg of water per 1 kg of FAME or FAEE, the FAME or FAEE finally is dried, e.g. in a vacuum plant, and then discharged from the process as marketable product. The $CH_3OH$ or $C_2H_5OH$ thermally expelled from the phase rich in water is charged to the mixing reactor of the first reaction stage, and the $C_3H_5(OH)_3$ left in the phase rich in water is obtained by evaporating the water.

A disadvantage of the process described above is that when washing the phase rich in ester, the soaps dissolved in non-separable $C_3H_5(OH)_3$ in the light phase rich in ester, which are formed as undesired components in the alkaline ester hydrolysis of the triglycerides, are decomposed to free fatty acids (FFA), which can no longer be separated economically from the FAME or FAEE. According to the European standard EN 14214, the content of FFA in FAME is limited to a maximum acid number of 0.5 [mg KOH/g]. When using vegetable oils or animal fats with greatly varying raw material qualities, the maintenance of this acid number is not always ensured.

SUMMARY

An aspect of the present invention is to provide a process for producing FAE and glycerol from vegetable oils or animal fats such that the maximum limit value of the acid number of 0.5 is not exceeded in the produced and traded and supplied FAME or FAEE for use in Diesel and spark-ignition engines.

In an embodiment, the present invention provides a method for producing $C_3H_5(OH)_3$ and at least one of fatty acid methyl ester (FAME) and fatty acid ethyl ester (FAEE) from at least one of vegetable oils and animal fats by base-catalyzed transesterification of triglycerides with at least one of $CH_3OH$ and $C_2H_5OH$. The method includes mixing the at least one of vegetable oils and animal fats, the at least one of $CH_3OH$ and $C_2H_5OH$ and at least one first catalyst in a first mixer so as to transesterify a portion of the triglycerides and provide a first mixture. In a first settler downstream of the first mixer, the first mixture is separated into a first light phase containing at least one of FAME and FAEE and a first heavy phase containing $C_3H_5(OH)_3$. The first light phase is withdrawn from the first settler and fed into a downstream second mixer. The first light phase is mixed with at least one second catalyst in the second mixer so as to transesterify a further portion of the triglycerides and provide a second mixture. In a second settler downstream of the second mixer, the second mixture is separated into a second light phase containing at least one of FAME and FAEE and into a second heavy phase containing $C_3H_5(OH)_3$. The second light phase is withdrawn from the second settler and mixed with soapless $C_3H_5(OH)_3$ so as to provide a dispersion. The dispersion is separated by density difference into a phase containing at least one of raw FAME and raw FAEE having an acid number of $\leqq 0.5$ and into a phase containing dissolved soaps and a catalyst and at least one of $C_3H_5(OH)_3$, $CH_3OH$ and $C_2H_5OH$. The at least one of raw FAME and raw FAEE is mixed with an aqueous acid so as to provide a third mixture. The third mixture is washed in counterflow with water so as to provide a washed third mixture and a first aqueous phase containing at least one of $CH_3OH$, $C_2H_5OH$, $C_3H_5(OH)_3$ and salts. Water contained in the washed third mixture is expelled so as to provide at least one of FAME and FAEE product. The second heavy phase from the second settler is recirculated to the first mixer. The first heavy phase from the first settler is combined with the first aqueous phase so as to obtain a first heavy phase mixture. The first heavy phase mixture is separated into a first phase containing at least one of $CH_3OH$ and $C_2H_5OH$ and into a second aqueous phase containing at least one of $C_3H_5(OH)_3$ and salts. The first phase is recirculated into the first mixer. Water from the second aqueous phase is evaporated and raw $C_3H_5(OH)_3$ is discharged.

BRIEF DESCRIPTION OF THE DRAWINGS

The present invention is described in greater detail below on the basis of embodiments and of the drawings in which:
FIG. 2 shows a separately illustrated process section [X].

DETAILED DESCRIPTION

Figure 1:
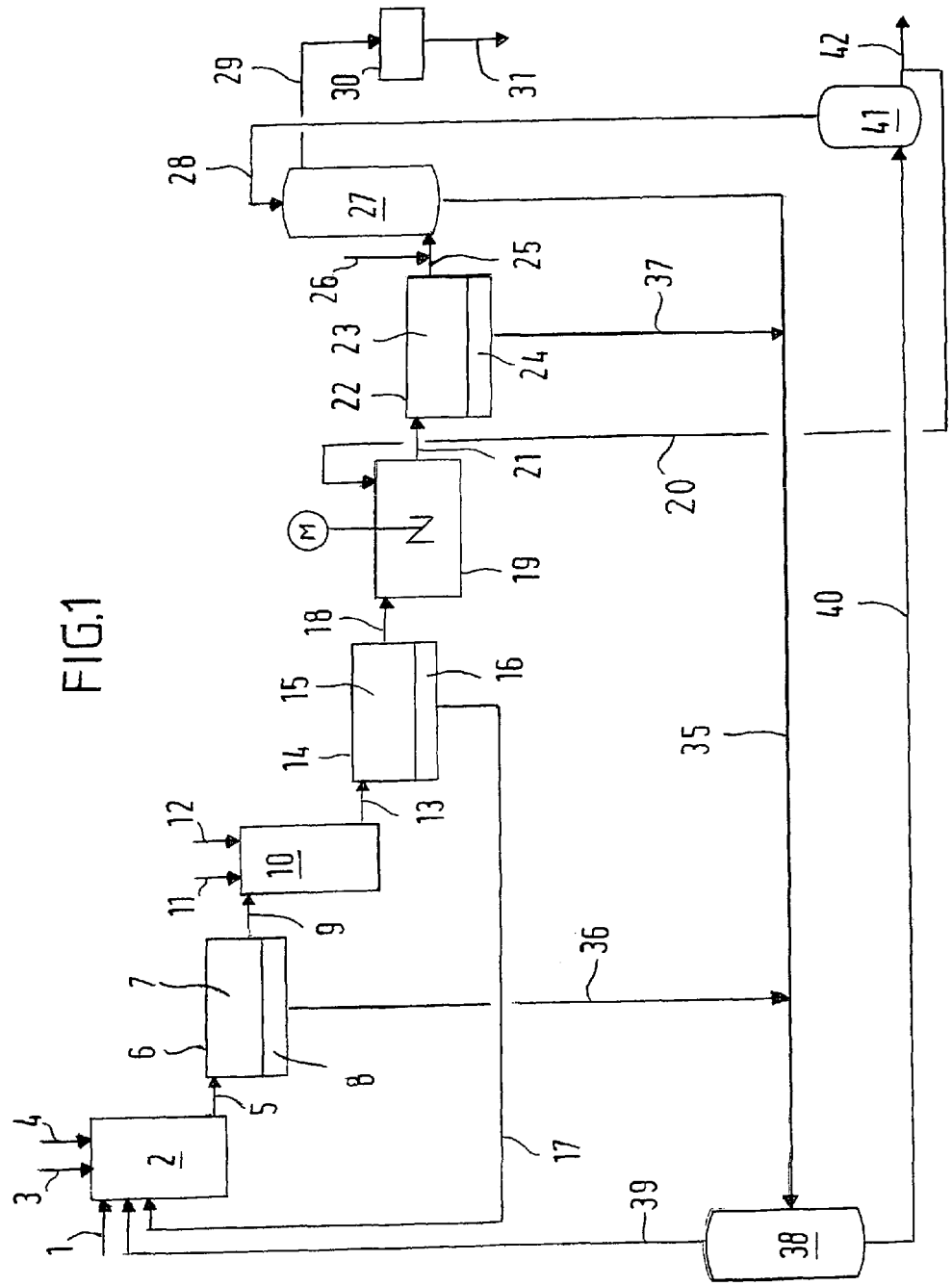
FIG. 1 shows a flow diagram for producing FAME.

Due to the smoothing-out of concentration effected between the raw FAE and the $C_3H_5(OH)_3$ dispersed therein, the soaps dissolved in the raw FAE and in the dissolved $C_3H_5(OH)_3$ are distributed to the comparatively larger volume of $C_3H_5(OH)_3$.

In an embodiment of the present invention, the phase chiefly containing FAE, which can be withdrawn from the settler of the second or last mixer-settler stage, can be guided in counterflow with soapless $C_3H_5(OH)_3$, a raw FAE with an acid number of <0.5, which by absorption is largely purified from $CH_3OH$ or $C_2H_5OH$ and dissolved soaps, to obtain a phase loaded with $C_3H_5(OH)_3$, $CH_3OH$, $C_2H_5OH$, dissolved soaps and catalyst.

In an embodiment of the process of the present invention, 1 to 10 wt-%, for example, 4 to 8 wt-% of soapless $C_3H_5(OH)_3$ can be dispersed into the FAE-containing phase withdrawn from the settler of the second or last mixer-settler stage.

In an embodiment of the present invention, the dispersion produced is heated to a temperature of 40 to 80° C., for example, 50 to 70° C. The FAE-containing phase withdrawn during the counterflow absorption and the soapless $C_3H_5(OH)_3$ can also be heated to this temperature. The solubility of $C_3H_5(OH)_3$ can be distinctly improved by heating.

In an embodiment of the present invention, the retention time of the defined dispersion volume or the contact time between the FAE-containing phase and the soapless $C_3H_5(OH)_3$ guided in counterflow thereto can be 1 to 10 min, for example, 5 to 10 min.

To obtain a rather pure raw FAE from the dispersion produced or from the phase withdrawn at the top of the counterflow column, an embodiment of the present invention provides for cooling the dispersion produced to temperatures of 5 to <40° C., for example, 20 to 30° C., before the physical separation into a raw FAE and a phase containing $C_3H_5(OH)_3$, $CH_3OH$ or $C_2H_5OH$. By lowering the temperature, a secondary reaction can be avoided and the formation of soaps can, for example, be prevented.

In an embodiment of the present invention, before water washing, the raw FAE with an acid number of <0.5 can be intensively mixed with 1 to 5 vol-% of an aqueous acid at a temperature of 25 to 60° C. and a retention time of 10 to 45 min, and the mixture produced can be physically separated by density difference into raw FAE free from phosphides and iron compounds and into a phase containing aqueous acid and sterols, and the aqueous phase can be supplied to a further treatment.

In an embodiment of the process of the present invention, the phase chiefly containing FAE, which can be discharged from the settler of the second or last mixer-settler stage, can be supplied to the bottom of a counterflow column equipped with structured packings, for example of the Montz® type, and can be intensively mixed in counterflow with raw $C_3H_5(OH)_3$ or pharmaceutically acceptable $C_3H_5(OH)_3$, washed in the process, enriched raw FAE is withdrawn at the top of the counterflow column, and from the bottom of the counterflow column $C_3H_5(OH)_3$ enriched with $CH_3OH$ or $C_2H_5OH$, soaps, catalysts and salts can be withdrawn and admixed to the $C_3H_5(OH)_3$ discharged from the settler of the first mixer-settler stage.

Via conduit (1), 1000 kg/h of deslimed, bleached and deacidified rape-seed oil together with $CH_3OH$ supplied via conduit (3) in an amount of 74 kg/h are supplied to the tubular reactor referred to as mixer (2) of the first mixer-settler stage and continuously charged together with $CH_3NaO$ supplied as catalyst via conduit (4) in an amount of 2.4 kg/h and intensively mixed with each other at a temperature of 75° C. by simultaneously transesterifying the triglycerides at atmospheric pressure. Via conduit (5), the reaction mixture formed is introduced into the gravity separator referred to as settler (6), in which the reaction mixture is physically separated by density difference into a light phase (7) containing 60 vol-% of FAME and a heavy phase (8) containing 30 vol-% of $C_3H_5(OH)_3$. The light phase (7), which contains 69.5% of the fatty acids contained in the rape-seed oil in the form of FAME, is introduced via conduit (9) into the mixer (10) of the second mixer-settler stage, to which 118 kg/h of $CH_3OH$ are supplied as catalyst via conduit (11) and 3.6 kg/h of $CH_3ONa$ are supplied as catalyst via conduit (12). These components are intensively mixed at a temperature of 60° C. and at atmospheric pressure by further transesterifying the triglycerides. Via conduit (13), the reaction mixture flows into the settler (14), in which the light phase (15) containing 90 vol-% of FAME is physically separated by density difference from the heavy phase (16) containing 10 vol-% of $C_3H_5(OH)_3$, and the heavy phase (16) is recirculated to the mixer (2) of the first mixer-settler stage via conduit (17).

The light phase (15) containing 90 vol-% of FAME, which is discharged from the settler (14) of the second mixer-settler stage and which contains 98.5% of the fatty acids contained in the rape-seed oil in the form of FAME with an acid number of 1.4, is introduced into a continuous mixer (19) operated with supercritical acceleration of the material to be mixed, for instance into an Ultraturax in-line mixer. Based on the volume of light phase present in the continuous mixer (19), 10 vol-% of process-internally produced soapless raw $C_3H_5(OH)_3$ with a $C_3H_5(OH)_3$ content of 80% are supplied to the continuous mixer (19) via conduit (20) and dispersed into the light phase at a temperature of 40° C., with the retention time in the continuous mixer (19) being 10 min. The dispersion transferred into the downstream gravity separator (22) via conduit (21) is cooled to a temperature of 30° C., in order to prevent secondary reactions and hence the formation of soaps. In the gravity separator (22), the dispersion is separated into a phase (23) containing 90 vol-% of FAME and into an alkaline phase (24) containing soaps, $CH_3OH$, salts, water and FAME with a pH value of 9. To the light phase (23) containing 90 vol-% of FAME, which is discharged via conduit (25) and has a temperature of 24° C., aqueous acid with a HCl content of 3% is admixed via conduit (26) in an amount of 1%, based on 100% FAME, for adjusting a pH value of 6 to 7. Thereafter, the phase substantially consisting of FAME is transferred to a washing column (27) and washed in the same in counterflow with 54 kg/h of water, which is supplied to the top of the washing column (27) via conduit (28). By adding the aqueous acid, the catalyst particles contained in the phase chiefly consisting of FAME are neutralized, the residual soaps contained in the FAME are decomposed, and $CH_3OH$ and $C_3H_5(OH)_3$ are washed out from the FAME. The raw FAME withdrawn at the top of the washing column (27), which still has a residual water content of 1.5% and in which only traces of free $C_3H_5(OH)_3$, $CH_3OH$ and catalyst are contained, flows through conduit (29) into a vacuum drier (30), in which the water is evaporated at a temperature of 120° C. and a pressure of 120 bar[a]. Via conduit (31), 1001 kg/h of FAME with an acid number of 0.35, which can be traded and supplied according to the standard EN 14214, are discharged from the process.

Alternatively, it is possible to replace the continuous mixer (19) with downstream gravity separator (22) by a washing column (32), in accordance with the process section [X] illustrated separately in FIG. 2. The light phase (15) consisting of 90 vol-% of FAME, which is discharged from the settler (14) of the second mixer-settler stage via conduit (18), is introduced at the bottom of the washing column (32) and guided in counterflow with process-internally obtained soapless 80% raw $C_3H_5(OH)_3$ charged at the top of the washing column (32) via conduit (33) by intensively mixing the two phases at the same time. The phase enriched at the top of the washing column (32), which is formed of almost 100 vol-% of FAME, is withdrawn via conduit (34) and fed into conduit (25). Upon feeding 1 vol-% of aqueous acid with a HCl content of 3% into conduit (25), the FAME phase is charged to the bottom of the washing column (27).

The washing water loaded with $CH_3OH$ and $C_3H_5(OH)_3$ is discharged from the washing column (27) via conduit (35) and together with the heavy phase (8) chiefly containing $C_3H_5(OH)_3$, which is discharged from the settler (6) of the first mixer-settler stage via conduit (36), and the phase containing $C_3H_5(OH)_3$, which is discharged from the gravity separator (22) or from the bottom of the washing column (32) via conduit (37), is charged to the rectification column (38) and thermally separated therein at a temperature of 63° C. and a pressure of 1 bar[a] into a phase consisting of $CH_3OH$ and into an aqueous phase containing $C_3H_5(OH)_3$. The phase containing $CH_3OH$, which is withdrawn at the top of the rectification column (38) in an amount of 82 kg/h (anhydrous), is recirculated to the mixer (2) of the first mixer-settler stage via conduit (39). The aqueous phase containing $C_3H_5(OH)_3$, which is discharged from the bottom of the rectification column (38) via conduit (40) in an amount of 169 kg/h, is evaporated in a boiler (41) at a temperature of 95° C., and 80% raw $C_3H_5(OH)_3$ is produced thereby. The steam discharged at the top of the boiler (41) is supplied to the top of the washing column (27) via conduit (28), and the raw $C_3H_5(OH)_3$ obtained is discharged from the process via conduit (42) for further use, for instance for producing pharmaceutically acceptable $C_3H_5(OH)_3$ by distillation, or is wholly or at least partly discharged via conduit (20) and dispersed into the phase chiefly consisting of FAME, which is present in the continuous mixer (19), or charged to the top of the washing column (32) via conduit (33) and guided in counterflow with the phase chiefly containing FAME.

To obtain a rather large reaction surface, the finely atomized raw or pharmaceutically acceptable $C_3H_5(OH)_3$ is applied onto the surface of the FAE-containing phase in accordance with the present invention.

By means of the process in accordance with the present invention, it is possible to produce a FAME or FAEE for use in Diesel or spark-ignition engines which can be traded and supplied, whose acid number certainly does not exceed the limit value of 0.5 and lies, for example, in the range from 0.1 to 0.3. In addition, the yield of FAME or FAEE can be increased by the measures in accordance with the present invention.

The present invention is not limited to embodiments described herein; reference should be had to the appended claims.

The invention claimed is:
1. A method for producing $C_3H_5(OH)_3$ and at least one of fatty acid methyl ester (FAME) and fatty acid ethyl ester (FAEE) from at least one of vegetable oils and animal fats by base-catalyzed transesterification of triglycerides with at least one of $CH_3OH$ and $C_2H_5OH$, the method comprising:
    mixing the at least one of vegetable oils and animal fats, the at least one of $CH_3OH$ and $C_2H_5OH$ and at least one first catalyst in a first mixer so as to transesterify a portion of the triglycerides and provide a first mixture;
    separating in a first settler downstream of the first mixer, the first mixture into a first light phase containing at least one of FAME and FAEE and a first heavy phase containing $C_3H_5(OH)_3$;
    withdrawing the first light phase from the first settler and feeding the first light phase into a downstream second mixer;
    mixing the first light phase with at least one second catalyst in the second mixer so as to transesterify a further portion of the triglycerides and provide a second mixture;
    separating, in a second settler downstream of the second mixer, the second mixture into a second light phase containing at least one of FAME and FAEE and into a second heavy phase containing $C_3H_5(OH)_3$;

withdrawing the second light phase from the second settler and mixing the second light phase with soapless $C_3H_5(OH)_3$ so as to provide a dispersion;

separating the dispersion by density difference into a phase containing at least one of raw FAME and raw FAEE having an acid number of $\leq 0.5$ and into a phase containing dissolved soaps and a catalyst and at least one of $C_3H_5(OH)_3$, $CH_3OH$ and $C_2H_5OH$;

mixing the at least one of raw FAME and raw FAEE with an aqueous acid so as to provide a third mixture;

washing the third mixture in counterflow with water so as to provide a washed third mixture and a first aqueous phase containing at least one of $CH_3OH$, $C_2H_5OH$, $C_3H_5(OH)_3$ and salts;

expelling water contained in the washed third mixture so as to provide at least one of FAME and FAEE product;

recirculating the second heavy phase from the second settler to the first mixer;

combining the first heavy phase from the first settler with the first aqueous phase so as to obtain a first heavy phase mixture;

separating the first heavy phase mixture into a first phase containing at least one of $CH_3OH$ and $C_2H_5OH$ and into a second aqueous phase containing at least one of $C_3H_5(OH)_3$ and salts;

recirculating the first phase into the first mixer; and evaporating water from the second aqueous phase and discharging raw $C_3H_5(OH)_3$.

2. The method as recited in claim 1, wherein the at least one first catalyst and the at least one second catalyst are the same.

3. The method as recited in claim 1, wherein 1 to 10 wt-% of soapless $C_3H_5(OH)_3$ is added to the second light phase from the second settler.

4. The method as recited in claim 3, wherein 4 to 8 wt-% of soapless $C_3H_5(OH)_3$ is added to the second light phase from the second settler.

5. The method as recited in claim 1, wherein the soapless $C_3H_5(OH)_3$ is preheated to a temperature of from 40 to 80° C.

6. The method as recited in claim 1, wherein the at least one raw FAME and raw FAEE is cooled to a temperature of 5 to 40° C.

7. The method as recited in claim 1, wherein a retention time for the dispersion is from 1 to 20 min.

8. The method as recited in claim 7, wherein a retention time for the dispersion is from 5 to 10 min.

9. The method as recited in claim 1, wherein prior to the washing in counterflow with water, the phase containing the at least one of raw FAME and raw FAEE is mixed with 1 to 5 vol-% of the aqueous acid at a temperature of 25 to 60° C. at a retention time of 10 to 45 min to provide a fourth mixture, the fourth mixture being separated by density difference into a phase containing the at least one of raw FAME and raw FAEE free from phosphatides and iron compounds and into a phase containing aqueous acid and sterols, the phase containing aqueous acid and sterols being treated further.

10. The method as recited in claim 1, wherein the second light phase or phase discharged from the settler of a last mixer-settler stage is supplied to a bottom of a counterflow column equipped with structured packings, is mixed and washed in counterflow with raw or pharmaceutically acceptable $C_3H_5(OH)_3$ so that enriched raw FAME and enriched raw FAEE is withdrawn at a top of the counterflow column, and $C_3H_5(OH)_3$ enriched with at least one of $CH_3OH$, $C_2H_5OH$, soaps, catalyst and salts is withdrawn from a bottom of the counterflow column and admixed to the first heavy phase containing $C_3H_5(OH)_3$.

11. The method as recited in claim 1, wherein the raw or pharmaceutically acceptable $C_3H_5(OH)_3$ is applied onto a phase containing the at least one of FAME and FAEE.

12. A method for producing $C_3H_5(OH)_3$ and at least one of fatty acid methyl ester (FAME) and fatty acid ethyl ester (FAEE) from at least one of vegetable oils and animal fats by base-catalyzed transesterification of triglycerides with at least one of $CH_3OH$ and $C_2H_5OH$, the method comprising:

mixing the at least one of vegetable oils and animal fats, the at least one of $CH_3OH$ and $C_2H_5OH$ and at least one first catalyst in a first mixer so as to transesterify a portion of the triglycerides and provide a first mixture;

separating in a first settler downstream of the first mixer, the first mixture into a first light phase containing at least one of FAME and FAEE and a first heavy phase containing $C_3H_5(OH)_3$;

withdrawing the first light phase from the first settler and feeding the first light phase into a downstream second mixer;

mixing the first light phase with at least one second catalyst in the second mixer so as to transesterify a further portion of the triglycerides and provide a second mixture;

separating, in a second settler downstream of the second mixer, the second mixture into a second light phase containing at least one of FAME and FAEE and into a second heavy phase containing $C_3H_5(OH)_3$;

withdrawing the second light phase from the second settler and feeding the second light phase in counterflow with soapless $C_3H_5(OH)_3$ so as to produce a phase containing at least one of raw FAME and raw FAEE with an acid number of $\leq 0.5$ purified from at least one of $CH_3OH$ and $C_2H_5OH$ and dissolved soaps by absorption, and a phase loaded with dissolved soaps and catalyst and at least one of $C_3H_5(OH)_3$, $CH_3OH$ and $C_2H_5OH$;

mixing the phase containing the at least one of raw FAME and raw FAEE with an aqueous acid so as to provide a third mixture;

washing the third mixture in counterflow with water so as to produce a washed third mixture and a first aqueous phase;

expelling water contained in the washed third mixture so as to provide at least one of FAME and FAEE product;

recirculating the second heavy phase from the second settler to the first mixer;

combining the first heavy phase from the first settler with the first aqueous phase so as to obtain a first heavy phase mixture;

separating the first heavy phase mixture into a first phase containing at least one of $CH_3OH$ and $C_2H_5OH$ and into a second aqueous phase containing at least one of $C_3H_5(OH)_3$ and salts;

recirculating the first phase into the first mixer; and evaporating water from the second aqueous phase and discharging raw $C_3H_5(OH)_3$.

13. The method as recited in claim 12, wherein the at least one first catalyst and the at least one second catalyst are the same.

14. The method as recited in claim 12, wherein 1 to 10 wt-% of soapless $C_3H_5(OH)_3$ is added to the second light phase from the second settler.

15. The method as recited in claim 14, wherein 4 to 8 wt-% of soapless $C_3H_5(OH)_3$ is added to the second light phase from the second settler.

16. The method as recited in claim 12, wherein the soapless $C_3H_5(OH)_3$ is preheated to a temperature of from 40 to 80° C.

17. The method as recited in claim 12, wherein the at least one of raw FAME and raw FAEE is cooled to a temperature of 5 to 40° C.

18. The method as recited in claim 12, wherein prior to the washing in counterflow with water, the phase containing the at least one of raw FAME and raw FAEE is mixed with 1 to 5 vol-% of the aqueous acid at a temperature of 25 to 60° C. at a retention time of 10 to 45 min to provide a fourth mixture, the fourth mixture being separated by density difference into a phase containing at least one of raw FAME and raw FAEE free from phosphatides and iron compounds and into a phase containing aqueous acid and sterols, the phase containing aqueous acid and sterols being treated further.

19. The method as recited in claim 12, wherein the second light phase or phase discharged from the settler of a last mixer-settler stage is supplied to a bottom of a counterflow column equipped with structured packings, is mixed and washed in counterflow with raw or pharmaceutically acceptable $C_3H_5(OH)_3$ so that enriched raw FAME and enriched raw FAEE is withdrawn at a top of the counterflow column, and $C_3H_5(OH)_3$ enriched with at least one of $CH_3OH$, $C_2H_5OH$, soaps, catalyst and salts is withdrawn from a bottom of the counterflow column and admixed to the first heavy phase containing $C_3H_5(OH)_3$.

20. The method as recited in claim 19, wherein the raw or pharmaceutically acceptable $C_3H_5(OH)_3$ is applied onto a phase containing FAME and FAEE.

\* \* \* \* \*